(12) United States Patent
Horn et al.

(10) Patent No.: US 7,055,337 B2
(45) Date of Patent: Jun. 6, 2006

(54) SYSTEM WITH AN INTERNAL COMBUSTION ENGINE, A FUEL CELL AND A CLIMATE CONTROL UNIT FOR HEATING AND/OR COOLING THE INTERIOR OF A MOTOR VEHICLE AND PROCESS FOR THE OPERATION THEREOF

(75) Inventors: Oliver Horn, Munich (DE); Noureddine Khelifa, Munich (DE); Alexander Kolb, Neuried (DE)

(73) Assignee: Webasto Thermosysteme International GmbH, Stockdorf (DE)

( * ) Notice: Subject to any disclaimer, the term of this patent is extended or adjusted under 35 U.S.C. 154(b) by 0 days.

(21) Appl. No.: 11/049,754

(22) Filed: Feb. 4, 2005

(65) Prior Publication Data

US 2005/0126195 A1    Jun. 16, 2005

Related U.S. Application Data

(62) Division of application No. 10/447,273, filed on May 29, 2003, now Pat. No. 6,865,901.

(30) Foreign Application Priority Data

| May 29, 2002 | (DE) | ................................ 102 23 949 |
| Dec. 12, 2002 | (DE) | ................................ 102 58 195 |
| Dec. 12, 2002 | (DE) | ................................ 102 58 196 |

(51) Int. Cl.
*B60H 1/32* (2006.01)
(52) U.S. Cl. ............................. 62/199; 62/236; 62/244
(58) Field of Classification Search .......... 62/199–200, 62/236, 244, 510
See application file for complete search history.

(56) References Cited

U.S. PATENT DOCUMENTS 2,248,756 A * 7/1941 Henney ........................ 62/133

(Continued)

FOREIGN PATENT DOCUMENTS

DE    198 50 829 C1    3/2000

(Continued)

OTHER PUBLICATIONS

Markus Flik et al., Behr GMBH & Co., Heating Systems for Vehicles With High Efficiency Engines, Behr Automobiltechnik, 1992, pp. 2-19, English Abstract.

*Primary Examiner*—William E. Tapolcai
(74) *Attorney, Agent, or Firm*—David S. Safran (57) ABSTRACT

A system with an internal combustion engine which has a heat transfer circuit, a fuel cell and a climate control unit which is accommodated in the heat transfer circuit of the internal combustion engine. The system has a heat transfer arrangement for transferring the exhaust heat of the fuel cell to the heat transfer circuit and a bypass for bridging a segment of the heat transfer circuit which runs through the internal combustion engine so that, in the bypassed operating state, an isolated circuit is formed. In stationary operation, this enables an optimized operating mode since the internal combustion engine is no longer heated and the exhaust heat of the fuel cell is fully available for heating purposes. The climate control unit can have a fuel cell and an arrangement for transferring the heat produced by the fuel cell to the vehicle interior has a fan unit by which an air flow can be produced for cooling the fuel cell and a heating unit which is powered by the fuel cell and by which the air flow for heating the vehicle interior can be additionally heated. For cooling or heating the interior of a motor vehicle, the system can have a cooling circuit with a compressor, a condenser, an expansion element, and a first evaporator and an APU or a fuel cell to electrically power the compressor, and a second cooling circuit a second evaporator, the second cooling circuit being connected to the first cooling circuit.

10 Claims, 10 Drawing Sheets

U.S. PATENT DOCUMENTS

| | | | |
|---|---|---|---|
| 4,873,837 A * | 10/1989 | Murray | 62/199 |
| 4,959,974 A * | 10/1990 | Kusakabe | 62/228.5 |
| 5,333,678 A | 8/1994 | Mellum et al. | |
| 5,678,418 A * | 10/1997 | Ueno et al. | 62/200 |
| 5,934,092 A | 8/1999 | Krompass et al. | |
| 5,950,752 A | 9/1999 | Lyons | |
| 6,109,045 A | 8/2000 | Takenaka | |
| 6,380,637 B1 | 4/2002 | Hsu et al. | |
| 6,448,535 B1 | 9/2002 | Ap | |
| 6,454,180 B1 | 9/2002 | Matsunaga et al. | |
| 6,467,698 B1 | 10/2002 | Gaarder et al. | |
| 6,543,243 B1 * | 4/2003 | Mohrmann et al. | 62/230 |
| 6,595,433 B1 | 7/2003 | Ap et al. | |
| 6,732,942 B1 | 5/2004 | Sangwan et al. | |
| 6,745,585 B1 * | 6/2004 | Kelm et al. | 62/236 |
| 6,886,356 B1 * | 5/2005 | Kubo et al. | 62/230 |
| 2001/0045103 A1 | 11/2001 | Khelifa | |
| 2002/0056580 A1 | 5/2002 | Friebe et al. | |

FOREIGN PATENT DOCUMENTS

| | | |
|---|---|---|
| DE | 199 01 807 C1 | 7/2000 |
| DE | 199 25 443 A1 | 12/2000 |
| DE | 199 61 825 A1 | 6/2001 |
| DE | 101 13 000 A1 | 9/2002 |
| EP | 1 203 697 A2 | 5/2002 |
| JP | 2001-233044 | 8/2001 |

\* cited by examiner

SYSTEM WITH AN INTERNAL COMBUSTION ENGINE, A FUEL CELL AND A CLIMATE CONTROL UNIT FOR HEATING AND/OR COOLING THE INTERIOR OF A MOTOR VEHICLE AND PROCESS FOR THE OPERATION THEREOF

CROSS REFERENCE TO RELATED APPLICATION

This application is a divisional of commonly owned, U.S. patent application Ser. No. 10/447,273, filed May 29, 2003 now U.S. Pat. No. 6,865,901.

BACKGROUND OF THE INVENTION

1. Field of the Invention

The invention relates to a system with an internal combustion engine which has a heat transfer circuit, with a fuel cell and with a climate control unit which is accommodated in the heat transfer circuit of the internal combustion engine for heating and/or cooling of the interior of a motor vehicle, as well as to a process for operating such systems.

2. Description of Related Art

Systems of the type to which the invention is directed are used if a fuel cell is to be available as an additional energy source. The fuel cell is used, first of all, to produce electrical energy with which the various assemblies of the motor vehicle are supplied. In the reaction which takes place in the fuel cell, heat is released which must be dissipated so that the temperature of the fuel cell does not exceed an allowable upper boundary. Here, it is conventional to provide a separate heat transfer circuit for the fuel cell since the fuel cell is made as a separate unit. This separate execution of the fuel cell has the advantage that the fuel cell can also be used in stationary operation, and thus, can be operated independently of the operation of other components of the vehicle. In stationary operation, for example, the compressor of a climate control unit, or also a stereo system, light source and all those energy consumers which are conventionally supplied by the battery in stationary operation are operated via the fuel cell; however this is only possible for a relatively short time due to the limited capacity of the battery.

The climate control unit which is a component of the system is conventionally accommodated in the heat transfer circuit of the internal combustion engine so that the heat produced by the internal combustion engine can be used to heat the motor vehicle interior. After a vehicle with an internal combustion engine is started, it takes a certain amount of time until the climate control unit can satisfactorily heat the motor vehicle since, first, the heat transfer circuit of the internal combustion engine must heat up to such an extent that the heat which the climate control unit can transfer to the motor vehicle is adequately available. Moreover, in modern internal combustion engines, there is the problem that the efficiency of the engine is so high that the heat transfer circuit can make available only comparatively little thermal energy for heating of the motor vehicle interior.

Auxiliary heaters which additionally heat the cooling liquid in the heat transfer circuit during the starting phase when the internal combustion engine has not yet reached its operating temperature are known. Such a heater is used in order to bring the internal combustion engine more quickly to its operating temperature, and on the other hand, to make available heat for the climate control unit. In the normal operating state, when the internal combustion engine has reached its operating temperature, the heat output can be improved by operation of the heater.

International Patent Application Publication WO 02/075131 A1 discloses a system with an internal combustion engine and a fuel cell in which the exhaust heat of a fuel cell is used to heat the internal combustion engine at the same time. For coupling of the fuel cell and internal combustion engine in heat engineering terms, it is proposed that either they be structurally joined to one another so that heat conduction from the fuel cell to the internal combustion engine takes place, or that there be a common heat transfer circuit for the fuel cell and internal combustion engine. Here, it is also proposed that the fuel cell be operated independently of the internal combustion engine in order to separately activate an auxiliary air conditioning system, auxiliary heating or readiness operation. The problem here is that the internal combustion engine is heated at the same time. While this improves the starting properties of the internal combustion engine, it takes a relatively large amount of energy. Especially in operating situations in which the engine is to be preheated and the interior is to be heated, not only briefly before starting the vehicle but, for example, in trucks with sleeping compartments, where the sleeping compartment must be heated over a long time interval, the heating of the internal combustion engine demands considerable amounts of energy.

On the other hand, for cooling, systems and processes are known, for example, from published German Patent Application DE 199 27 518 A1 in which the compressor of the cooling circuit is supplied with energy by a fuel cell in order to thus be able to carry out stationary air conditioning of the vehicle interior. Use of a fuel cell as the energy supplier for a compressor has taken into account problems which occurred in conjunction with other stationary air conditioning systems, for example, when using latent storages. Since latent storages occupy a large volume and have a cooling duration which is greatly limited in time, their use is not suited in many cases.

Likewise, according to German Patent Application DE 199 27 518 A1 and the use of a fuel cell proposed there, the problems in electrical supply of a compressor by the motor vehicle battery should be solved. This is because, when using the motor vehicle battery as the energy supplier, the duration of cooling is also greatly limited, there even being the risk that, after completed stationary air conditioning, sufficient battery power for starting is no longer present.

It is furthermore known that an auxiliary air conditioning system can also be operated by the internal combustion engine of the motor vehicle when stopped or by an additional motor. However, of course, this also has the disadvantages that disturbing noise occurs, power consumption is high, and burdensome emissions are formed.

An air conditioning system in which a compressor is operated using a fuel cell thus offers a useful starting point for further developments. If in any case the air conditioning system is intended for use while driving and also when stopped, there are requirements which can only be met with difficulty at the same time. While driving it can often be necessary to dissipate high thermal output. In contrast, when the vehicle is stopped, for example, in the air conditioning of the sleeping compartment of a truck, what is important is to be able to air condition with low heat dissipation per unit of time over a long interval. Therefore, if a system is designed for stationary air conditioning, a fuel cell is chosen with correspondingly low output and a corresponding compressor; however, this would result in that the air conditioning could be inadequate while driving.

However, even if the fuel cell and the compressor were designed to be large enough, there would still be different requirements with respect to different situations or also with respect to different areas of the vehicle interior, so that for this reason, the problems would not be adequately solved.

SUMMARY OF THE INVENTION

A primary object of the present invention is to devise a system with an internal combustion engine, a fuel cell and a climate control unit which, both in stationary operation and also when driving, enables an operating mode in which the exhaust heat of the fuel cell is optimally used.

A further object of the invention is to provide a system and a process which is especially adapted to achieving air conditioning both when the internal combustion engine is stopped and while driving; in particular, such that it will also be possible to use the system and process in an advantageous manner for heating the vehicle interior or to act in a support role.

Another object of the invention is to devise a climate control unit in which, even when stopped, heating operation is possible, exhaust heat of a fuel cell being used and the climate control unit being simple and economical.

The first object is achieved in accordance with the invention by a system of the initially mentioned type in which there are heat transfer means for transferring the exhaust heat of the fuel cell to the heat transfer circuit and there are bridging means for bridging the segment of the heat transfer circuit which runs through the internal combustion engine so that an isolated circuit is formed in the bridged operating state.

By the formation of an isolated circuit in accordance with the invention, the heat transfer circuit can be configured depending on the operating situation such that, when driving, the exhaust heat of the fuel cell is transferred to the internal combustion engine, or in stationary operation is available only for the climate control unit for heating of the motor vehicle interior. The transfer means are formed, in one advantageous embodiment, by a 3-way valve and a bypass line, the bypass line bridging all those components which are not necessary in stationary operation, especially the internal combustion engine, for avoiding heating of its comparatively high mass.

The heat transfer means are formed in an especially simple manner by a segment of the heat transfer circuit being routed through the fuel cell.

In another advantageous version, the hot exhaust gas of the fuel cell is routed via a heat exchanger which is accommodated in the heat transfer circuit.

In a third advantageous version, the fuel cell is connected to an afterburner for afterburning of the exhaust gas of the fuel cell, the exhaust gas of the afterburner being routed via a heat exchanger which is accommodated in the heat transfer circuit. The second and third advantageous versions can be used especially for solid oxide fuel cells (SOFC) since this type of fuel cell works at very high temperatures and therefore, the exhaust gas is very hot.

The climate control unit is advantageously equipped with a heat exchanger for heating the vehicle interior, an electrical heater connected to the fuel cell for power supply, and a first evaporator of the cooling circuit. In this way, the climate control unit can be easily used as an auxiliary heater since both the generated electrical energy as well as the exhaust heat of the fuel cell are supplied to the climate control unit to heat the motor vehicle. By accommodating the evaporator of a cooling circuit, the climate control unit can also be used as a stationary cooling device, the electrical energy produced by the fuel cell being used to operate the cooling circuit.

To operate the system in accordance with the invention as an auxiliary cooling device, a heat exchanger is incorporated into the isolated circuit for dissipating heat from the heat transfer circuit. The heat exchanger can be the radiator of the internal combustion engine or also a separate heat exchanger with dimensioning which has been matched to operation of the isolated circuit.

With regard to the second object, it is especially advantageous to accommodate an additional compressor which is mechanically driven by the internal combustion engine in the cooling circuit, the electrically driven compressor and the mechanically driven compressor being arranged redundantly and being able to be turned on and off individually. Thus, when driving, the mechanically operated compressor can be used to operate the cooling circuit, while in stationary operation the electrically driven compressor is active. The electrically driven compressor can also be used to support the operation of the mechanically driven compressor when driving.

To optimize the cooling circuit, in one advantageous development, two component circuits are formed, the first component circuit being formed by the first evaporator, the condenser and the electrically driven compressor, and the second component circuit being formed by the second evaporator, the condenser and the compressor which is mechanically driven by the internal combustion engine. Thus, individual areas of the motor vehicle can only be cooled in stationary operation, while others are cooled only while driving or while driving and while stopped.

As an alternative to the use of two compressors, a hybrid compressor can also be used which can be driven both mechanically by the internal combustion engine and also electrically with power supplied by the fuel cell.

A system with two component circuits can be used especially advantageously in a truck with a cab which has a rear and a front area, the first evaporator being assigned to the rear area and the second evaporator being assigned to the front area. In this way, it is possible during different operating states of the motor vehicle to individually control the climate of different areas of the vehicle interior with different evaporators, and each of the evaporators or the incorporation of each of the evaporators into the overall system with respect to the respective situation or the respective area of the vehicle interior can be optimized. Even if this invention is described essentially using a system with a fuel cell, it exhibits its advantages not only in this connection, but also in conjunction with some other APU (auxiliary power unit) which can be implemented in the simplest case, for example, as a motor-driven generator.

It is especially useful for the first compressor to be connected to a first evaporator and for the second compressor to be connected to the second evaporator. The first evaporator which is supplied with energy by the fuel cell can interact in this way with an evaporator which is designed especially for the output of the fuel cell which can be chosen preferably to be low. The second compressor is matched to the second evaporator, and the two components can be designed for the required climate control performance.

Likewise it can be provided that the second compressor is connected to the first evaporator. Therefore, for example, if the first compressor interacts with the first evaporator while the vehicle is stopped, it can still be useful, for example, for the second compressor to interact with the first evaporator while driving. In this way, it is then possible to avoid operation of the fuel cell since the two evaporators interact with the same compressor.

It can likewise be useful for the first compressor to be connected to the second evaporator. This can be especially preferable in the case in which a hybrid compressor is used as the sole compressor. In this case, the hybrid compressor must perform the compression work necessary for the air conditioning during all driving situations and for all areas of the vehicle interior.

Furthermore, it is especially useful for the first evaporator to be designed for cooling the sleeping compartment of a commercial vehicle, especially for stationary air conditioning. The first evaporator can thus be optimized with respect to the air conditioning of the sleeping compartment. In general it can therefore be designed to be correspondingly small.

In this sense, it is likewise useful for the second evaporator to be designed for cooling the driver's compartment of a passenger vehicle. Here, in general, higher air conditioning performance is desired, so that a larger evaporator is used.

In another embodiment of the invention for cooling or heating the interior of a motor vehicle, when stopped, the interior is cooled with a second cooling circuit which is connected to the first cooling circuit, a compressor being driven by means of electrical energy from an APU or fuel cell. This will not preclude the fact that the operating mode intended for stationary climate control can also be used when driving. In this way, the advantages and particulars of the system in accordance with the invention are also realized within the framework of the process. This also applies to the especially preferred embodiments of the process in accordance with the invention described below.

In particular, the process in accordance with the invention is advantageously developed in that there is a second compressor which is driven by means of mechanical energy while driving.

Likewise it can be especially useful for the first compressor to be a hybrid compressor.

It is also particularly useful for the first compressor to interact with the first evaporator and for the second compressor to interact with the second evaporator. It can likewise be provided that the second compressor interacts with the first evaporator and/or for the first compressor to interact with the second evaporator.

The third object of the invention is obtainable using a climate control unit which has a fan unit by which an air flow can be produced for cooling the fuel cell and an electrical heating unit being supplied with power by the fuel cell and by which the air flow can be heated to heat the vehicle interior.

The climate control unit of the invention can be used independently of the vehicle. Cooling of the fuel cell by an air flow can be much more economical than by a liquid circuit. In addition, the transfer of heat to an air flow which heats the interior is eliminated since the air flow routed through the fuel cell can be used directly to heat the vehicle interior.

In the additional, heating of the air flow by an electrical heating unit which is powered by the fuel cell allows the energy generated in the fuel cell to be used twice. On the one hand, the generated current in the electrical heating unit is converted into heat, and on the other hand, the exhaust heat produced in the generation of current is likewise used for heating of the vehicle interior. Since only low power need be produced by this separate fuel cell for the climate control unit, cooling with air is sufficient and the fuel cell is not overheated.

Furthermore, it is advantageous that the climate control unit can also be used for operating a cooling circuit. The generated electrical current is used to drive a compressor. The exhaust heat produced by the fuel cell in this operating mode is not routed into the vehicle interior, but dissipated to the outside. In this way, a cooling operation is possible when the vehicle engine is turned off.

In another version of the climate control unit of the invention, the air flow routed through the fuel cell is not routed directly into the vehicle interior, but the heat is transferred in a heat exchanger to a flow of fresh air.

In one advantageous embodiment of a climate control unit in which a cooling function is also implemented, the cooling circuit has an electrically driven compressor and a mechanically driven compressor which are located parallel to one another. The mechanically driven compressor is therefore used when driving, while the electrically driven compressor when stopped is used to operate the cooling circuit or can be used while driving for supporting the mechanical compressor.

The invention is based, in part, on the finding that, especially for climate control of the sleeping compartment of a commercial vehicle, the energy from the fuel cell can be advantageously used. The fuel cell can be designed to be correspondingly small as a result of the low power consumption. High climate control performance while driving can be made available by other energy sources.

The invention is described in detail below with reference to the embodiments illustrated in the accompanying drawings.

DETAILED DESCRIPTION OF THE INVENTION

Figure 1:
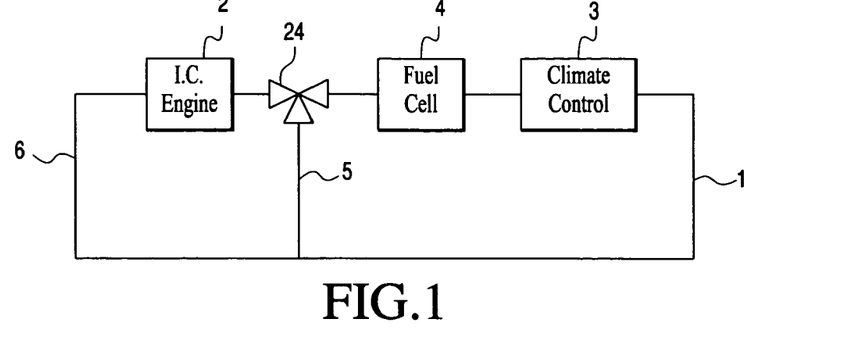
FIG. 1 shows a simplified schematic of a system in accordance with the invention.

FIG. 1 shows a system in accordance with the invention in a simple schematic. While driving, a climate control unit 3, a PEM fuel cell 4 and an internal combustion engine 2 are joined together in a heat transfer circuit 1. Both the heat produced in the internal combustion engine 2 and also the heat produced in the fuel cell 4 are transported via the heat transfer circuit 1 to the climate control unit 3 which can use the heat for heating of the vehicle interior via a suitable heat exchanger. Between the fuel cell 4 and the internal combustion engine 2, there is a 3-way valve 24 which is designed to interrupt the connection between the fuel cell 4 and the internal combustion engine 2 in the heat transfer circuit 1 and instead to bridge the segment 6 of the heat transfer circuit 1 which runs through the internal combustion engine 2 by a bypass line 5. The coolant is circulated therefore in the resulting isolated circuit only through the fuel cell 4 and the climate control unit 3. A pump which provides for circulation is not shown in FIG. 1, but of course is provided at a suitable location. The term "fuel cell" used here is defined as an entire fuel cell system which also comprises the secondary assemblies for supplying a suitable fuel. The exact progressions of the inner processes in the fuel cell are not important to the invention and are therefore not explained in detail.

The heat transfer circuit 1 with the incorporation of the internal combustion engine 2 is intended mainly for operation while driving, while use of the isolated circuit without the internal combustion engine 2 is intended mainly for stationary operation. However, mixed operation is also possible, in which the coolant flow is divided into line segments 6, 5 in order, for example, at the start of driving not to dissipate too much heat from the internal combustion engine 2, but nevertheless to achieve sufficient heating action.

The climate control unit 3 is set up in a simple version only to heat the vehicle interior, but can also be expanded by a cooling circuit so that there are both a heating and cooling function by the climate control unit 3.

Figure 2:
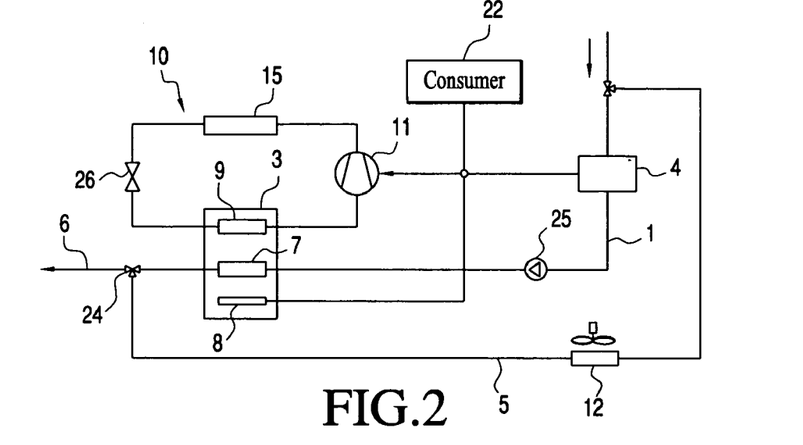
FIG. 2 shows a first embodiment of a system in accordance with the invention with a cooling circuit with an electrically driven compressor.

FIG. 2 shows a more detailed representation of the system from FIG. 1. The heat transfer circuit 1 is not shown completely by the internal combustion engine 2 and the segment 6 of the heat transfer circuit 1 which runs through it being omitted. In the segment of the heat transfer circuit 1 which is used in any case and through which coolant flows both while driving and when stopped there is a pump 25. The climate control unit 3 is shown in greater detail in FIG. 2 and has a heat exchanger 7 for heating the vehicle interior. Moreover, there is an electrical heater 8 which is supplied by the fuel cell 4, and for this reason, is connected to it. When driving, it is of course unnecessary for the electric heater 8 to be supplied solely by the fuel cell, but supply can also take place from another energy source of the vehicle electrical system. It is also possible that during the starting phase of the fuel cell, when it cannot yet make available full power, the fuel cell is supported by the vehicle battery.

The climate control unit 3 from FIG. 2 is equipped with a cooling circuit 10 which comprises an evaporator 9, a compressor 11, a condenser 15 and a control valve 26. Liquid coolant is evaporated in the evaporator 9. The heat which is necessary for this purpose is removed from the vicinity of the evaporator 9 so that it is cooled. In the function of a climate control unit for motor vehicles, the hot air is received either, for example, from the vehicle interior or from the outside and is blown into the vehicle interior as cooled air. The coolant which leaves the evaporator 9 under low pressure and in vapor form is compressed by the compressor 11. The now highly superheated steam is supplied to the condenser 15, where it condenses and leaves the condenser 15 as liquid coolant. The condenser 15 likewise requires a fan for its operation, which is however not shown in FIG. 2 for the sake of clarity. The circuit is thus closed.

The compressor 11 of the cooling circuit 10 is driven electrically. The electric motor which is used is supplied by the fuel cell 4. Of course, it is also possible for not only the compressor 11 or the electrical heater 8 to be supplied from the fuel cell 4, but for other consumers 22 to also be connected to the fuel cell 4 and to be supplied at the same time.

In stationary operation, as stated above, the segment 6 of the heat transfer circuit 1 which runs through the internal combustion engine 2 is bridged by the bypass line 5. In stationary heating operation, the heat produced by the fuel cell 4 is used to heat the vehicle interior so that the generated heat can be adequately dissipated. In stationary cooling operation, the current produced by the fuel cell is used to operate the compressor 11, but the exhaust heat generated by the fuel cell 4 cannot be dissipated via the vehicle heating system. Therefore, in the bypass line 5, there is another heat exchanger 12 which dissipates the excess heat from the heat transfer circuit 1. Thus, the heat exchanger 12 has a fan which ensures adequate operation of the heat exchanger 12 even when stationary.

Another alternative is not to activate the bypass line 5 during stationary cooling, but to use the entire heat transfer circuit 1 with the segment 6 which runs through the internal combustion engine. The exhaust heat of the fuel cell 4 is routed via the engine and the radiator assigned to it, where the heat is dissipated.

Figure 3:
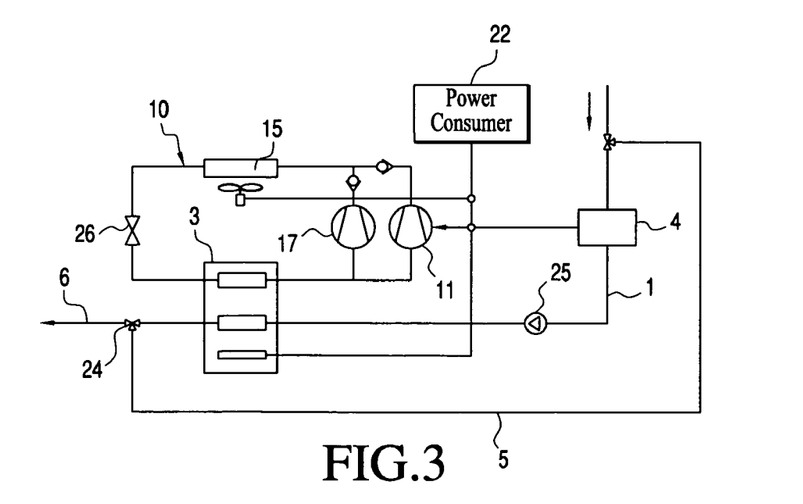
FIG. 3 shows a modification of the embodiment from FIG. 2 with an additional mechanically driven compressor.

FIG. 3 shows a modification of the system from FIG. 2. In contrast to FIG. 2, in the cooling circuit 10 there are two compressors 11 and 17. The compressor 11 is, in turn, an electrically driven compressor which is connected to the fuel cell 4 for this purpose, while the compressor 17 is mechanically driven by the internal combustion engine. The compressor 17 is sufficient for operating the cooling circuit 10 while driving. The fuel cell 4 could therefore be turned off. However, there are operating situations in which heavy loading of the internal combustion engine by the compressor 17 is to be avoided, for example, because power is to be fully available for driving the motor vehicle, so that it is a good idea to connect the electrically operated compressor 11 in parallel so that compression of the vaporous coolant is managed jointly by the two compressors. The two compressors can be turned on and off individually by the two check valves. The mechanical compressor 17 can therefore also be turned off completely and the electrical compressor 11 manages the task in the cooling circuit 10 alone. This is especially advantageous when stationary cooling operation is to be enabled; the mechanical driving of the compressor 17 is therefore omitted.

Figure 4:
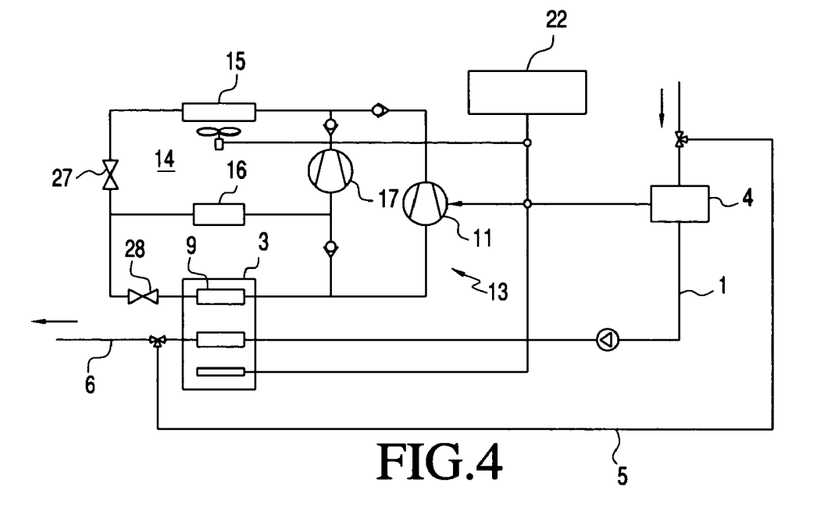
FIG. 4 shows another modification of the embodiment from FIGS. 2 & 3 with a cooling circuit which has two component circuits.

The embodiment shown in FIG. 4 is suitable for an application in which a cooling circuit has a front system and a rear system. Accordingly two component circuits 13, 14 are formed. The first component circuit 13 comprises the first evaporator 9, the electrically driven compressor 11 and the condenser 15. The evaporator 9 is thus assigned to the rear system, therefore cooling the rear area of the vehicle. The second component circuit 14 comprises a second evaporator 16, a mechanically driven compressor 17, and a condenser 15. The second evaporator 16 is assigned to the front system, therefore cooling the front area of the motor vehicle.

While driving in a truck, typically, only the front part of the cab is used, accordingly only the second evaporator 16 is necessary for cooling. In this operating mode, the internal combustion engine is in operation and can drive the mechanically driven compressor 17. In stationary operation, conversely, the rear part of the cab, where the sleeping area is located, is to be cooled. This area is the responsibility of the first evaporator 9 to which the electrically driven compressor 11 is assigned. In stationary operation, the internal combustion engine is not running, but the fuel cell 4 is in operation and can supply the electrically driven compressor 11 with current. The two component circuits can be connected to one another via valves so that the two compressors 17, 11 work redundantly. Two control valves 27, 28 control the output of the two component circuits 13, 14.

Figure 5:
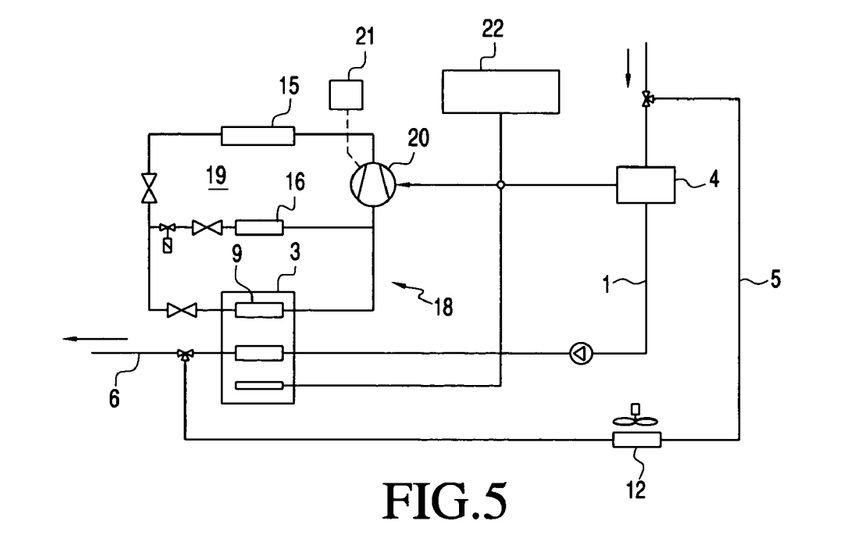
FIG. 5 shows a modification of the embodiment from FIG. 4 with a hybrid compressor.

In the embodiment from FIG. 5, instead of the two compressors, one being driven electrically and the other mechanically driven, a so-called hybrid compressor 20 is used. It can be driven both by an electric motor which is supplied by the fuel cell 4 and also mechanically by the internal combustion engine. In this embodiment, two component circuits 18, 19 are formed, the first evaporator 9 being assigned to the rear system and the second evaporator 16 being assigned to the front system. A control 21 triggers the hybrid compressor 20 such that, when driving, it is mechanically driven by the internal combustion engine, and when stationary, it is electrically driven by the electric motor which is supplied by the fuel cell 4. If a mechanical drive possibility of the compressor 20 is to be omitted as a result of the vehicle concept, instead of the hybrid compressor, an electrically driven compressor can also be used.

The incorporation of the fuel cell 4 into the heat transfer circuit 1 as shown in FIGS. 1 to 5 is especially suited for so-called PEM (proton exchange membrane) fuel cells since they work at a comparatively low temperature.

Figure 6:
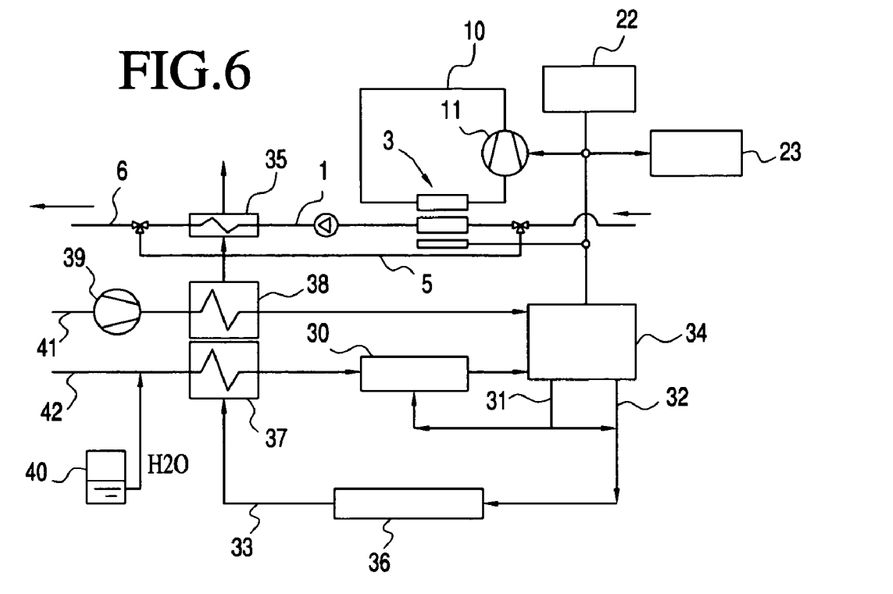
FIG. 6 shows a second embodiment of a system in accordance with the invention with a SOFC fuel cell.
Figure 7:
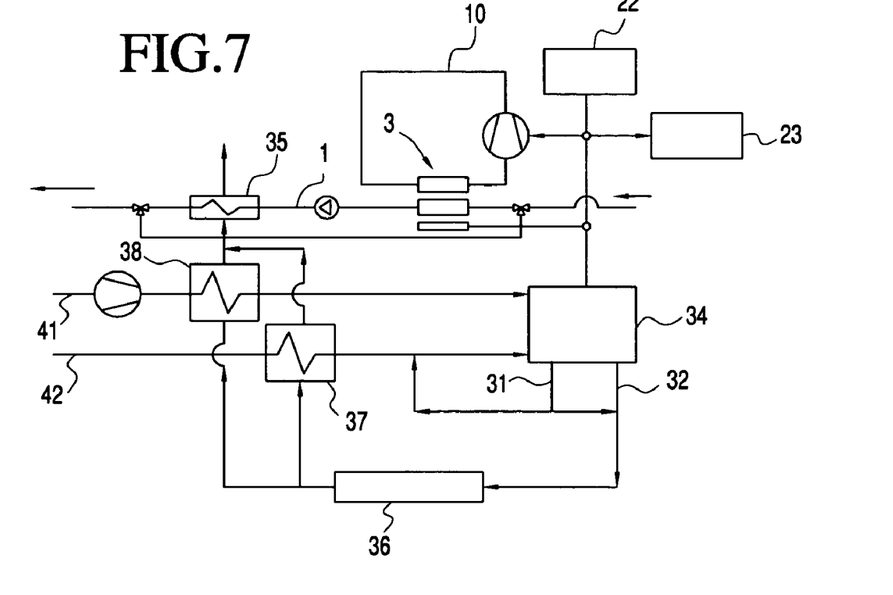
FIG. 7 shows a modification of the embodiment from FIG. 6.

In the embodiment of FIGS. 6 & 7, conversely, a so-called SOFC fuel cell (solid oxide fuel cell) is used. These fuel cells work at a much higher temperature. Instead of incorporating the fuel cell directly into the heat transfer circuit 1, the exhaust heat of the SOFC fuel cell arrangement 34 is dissipated via the anode exhaust gas 31 and the cathode exhaust 32. They are supplied to an afterburner 36, for example, a catalytic afterburner, toxic components, such as carbon monoxide, being re-burned and leaving the afterburner 36 as harmless exhaust gas 33. This gas flow which has been heated further flows through two heat exchangers 37, 38, in the first heat exchanger 37, the fuel 42 being preheated and supplied to the fuel cell arrangement 34, and air 41 being preheated in the second heat exchanger 38, which air is likewise supplied to the fuel cell arrangement 34. The air 41 is compressed beforehand by a compressor 39. However, the exhaust gas 33 of the afterburner 36, after passing through the two heat exchangers 37, 38, still has such a high temperature that this heat can be transferred in another heat exchanger 35 to the heat transfer circuit 1. The heat transfer circuit 1 is, in turn, made such that an isolated circuit can be formed with the bypass line 5. In stationary heating operation, therefore, the fuel cell 34 heats the coolant in the heat transfer circuit 1 via its exhaust gas which has been burned in the afterburner 36, so that this heat can be decoupled in the climate control unit 3 for heating of the vehicle interior.

In turn, a cooling circuit 10 is shown schematically which can be added to the climate control unit 3 for making available the possibility of motor vehicle cooling.

The SOFC fuel cell arrangement 34 contains an integrated reformer by which a hydrogen-containing gas which is burned in the actual fuel cell to generate current is produced from the fuel which is ordinarily carried, such as gasoline or diesel. For satisfactory operation of the reformer, it is necessary for preliminary reactions to take place in a pre-reformer before fuel supply. In doing so, for example, long diesel molecule chains are decomposed into shorter molecule chains, For these preliminary reactions, a relatively high temperature is necessary, so that the exhaust heat of the fuel cell 34 is also used in the embodiment from FIG. 6 to heat the pre-reformer 30. The fuel or the fuel mixture leaves the pre-reformer 30 with a temperature of roughly 600° C.

In addition, in the system shown in FIG. 6, there is a water tank 40 which is used to humidify the supplied fuel 32; this improves reforming to produce the hydrogen-containing gas.

The electrical current produced by the fuel cell 34 can be used both for an electrical compressor 11 of the cooling circuit 10 and also for other electrical consumers 22 or charging of a battery 23.

In the modified version from FIG. 7, the exhaust gas of the catalytic afterburner 36 is routed in parallel to the two heat exchangers 37, 38, so that an exhaust gas with a higher temperature is available to preheat the supplied air 41. In addition, there is no pre-reformer, but the exhaust gas 31 of the fuel cell 41 is supplied again directly to it.

Figure 8:
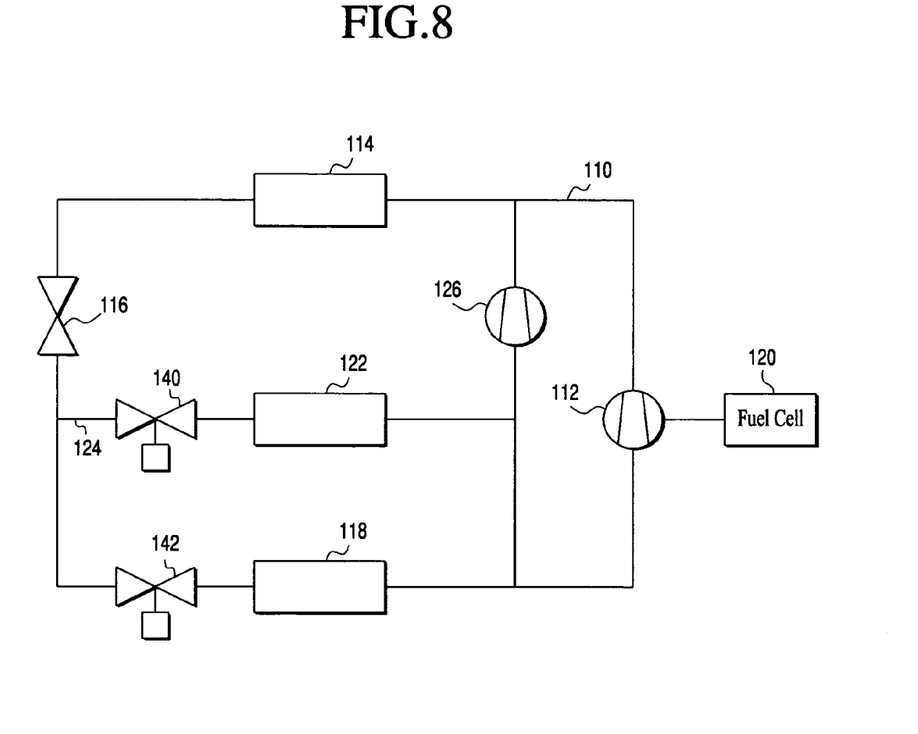
FIG. 8 is a schematic connection diagram of another embodiment of the system of the present invention.

FIG. 8 shows a schematic connection diagram of the system of the invention having a first cooling circuit 110 in which there are a first compressor 112, a condenser 114, an expansion element 116 and a first evaporator 118. The compressor 112 is supplied with power by a fuel cell 120. In this way, heat energy can be removed from the space surrounding the evaporator 18 by the evaporator 18. Furthermore, a second cooling circuit 124 is implemented which has a second compressor 126 and a second evaporator 122. Other components of the second cooling circuit 124 are the condenser 114 which has already been mentioned in conjunction with the first cooling circuit 110, and the corresponding expansion element 116. The second evaporator 122 can remove heat from the space surrounding it by operating this cooling circuit.

These components can now interact in a diverse manner that can be influenced or set by the solenoid valves 140, 142 and other switching components.

For example, it is possible that, while driving the motor vehicle, only the second cooling circuit 124 is operated, specifically by the compressor 126 being supplied by the energy of the internal combustion engine. The evaporator 122 can, for example, remove heat from the driver's compartment and thus air condition it. When the vehicle is stopped, it can be useful, for example, for only the first compressor 112 to be operated so that, for example, heat is removed from the sleeping compartment of the motor vehicle by the evaporator 118.

Figure 9:
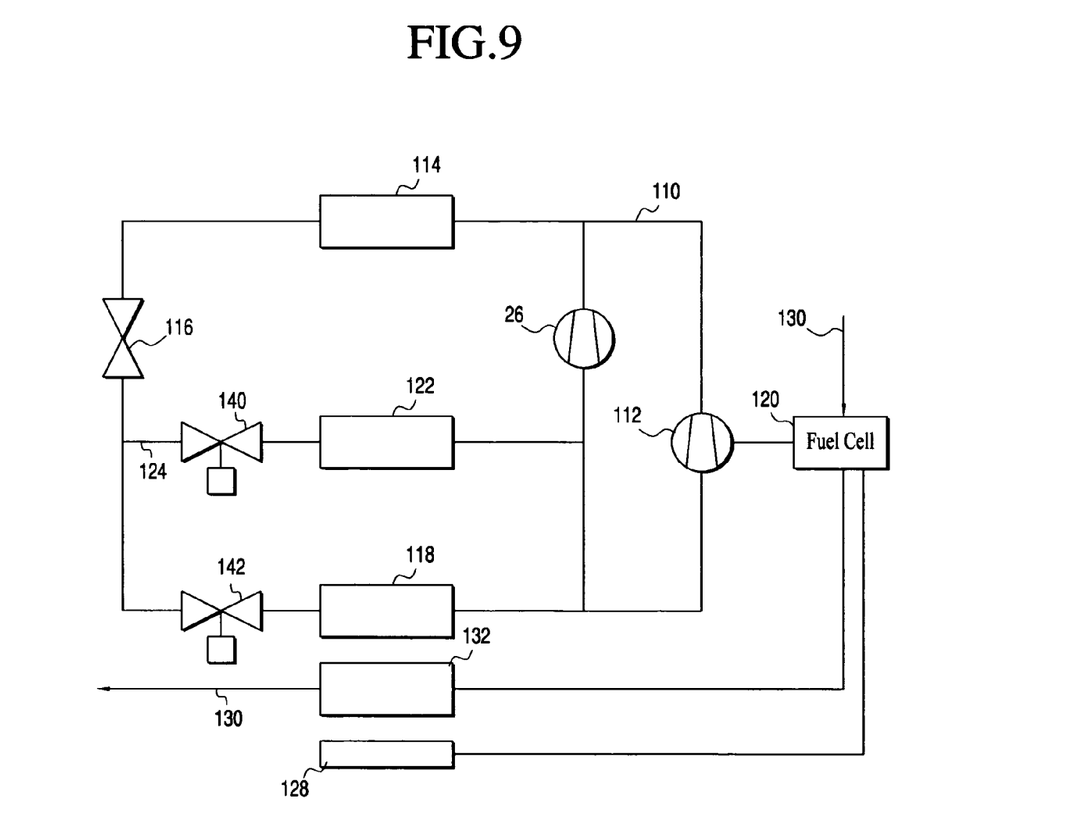
FIG. 9 is a schematic connection diagram of another system in accordance the invention.

FIG. 9 shows a schematic connection diagram of another version of the system in accordance with the invention. With respect to the cooling circuits 110, 124, this embodiment of the system is identical to the embodiment which is shown in FIG. 8. In addition, the fuel cell 120 can run an electrical heater 128 which can deliver heat into the area in which, during cooling operation, the first evaporator 118 is active. For example, the sleeping compartment of a truck can be heated in this way on cold nights via the fuel cell. In order to use the exhaust heat of the fuel cell 120 in addition, the exhaust heat is likewise sent via the engine cooling circuit or an isolated circuit 130 bypassing the engine to the heat exchanger 132, from where it travels into the sleeping compartment, using a bypass similar to the bypass 5 of the circuits of FIGS. 1–7.

Figure 10:
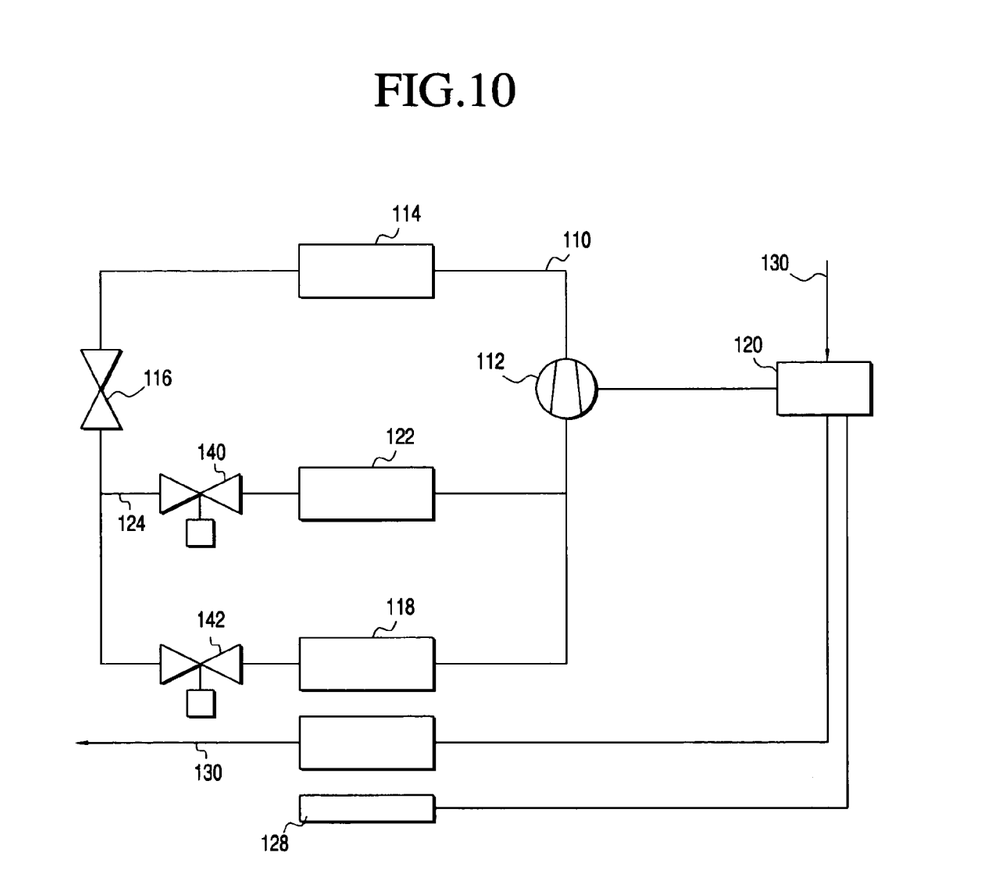
FIG. 10 is a schematic connection diagram of yet another system in accordance with the invention.

FIG. 10 shows a schematic connection diagram of another system in accordance with the invention. With respect to the heating function, FIG. 10 is identical to the embodiment which was described in FIG. 9. The cooling circuits 110, 124 are made differently. There is only one compressor 112 which is made either as an electrical compressor or as a hybrid compressor, i.e., it can be electrically and mechanically driven. The two evaporators 118, 122 can be selectively used by suitable fluid guidance in this way so that ideal climate control conditions can be achieved individually depending on the situation or for different areas of the motor vehicle.

Figure 11:
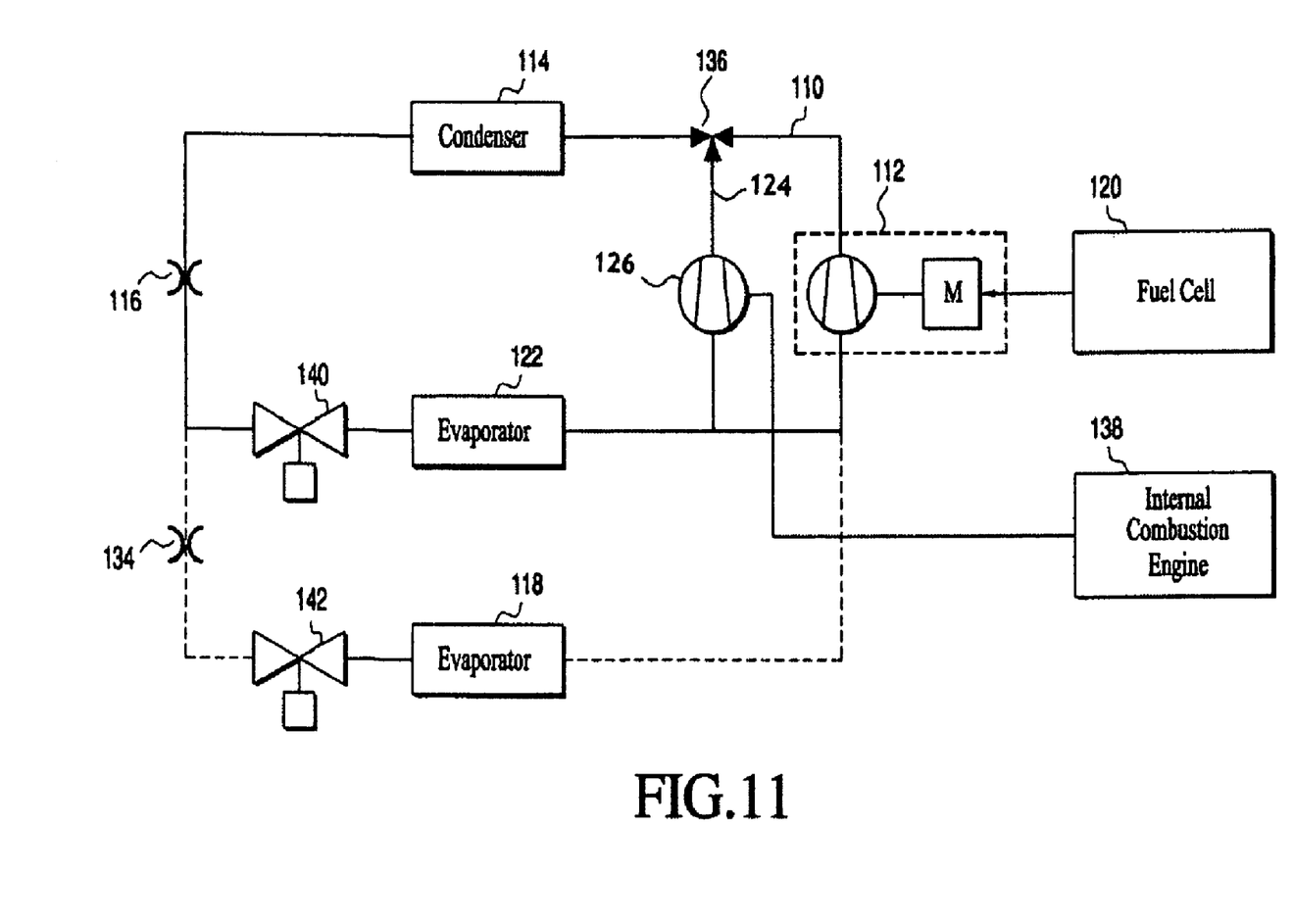
FIG. 11 is a schematic connection diagram of a further system in accordance with the invention

FIG. 11 shows a schematic connection diagram of another system in accordance with the invention. The solid lines show a first cooling circuit 110 and a second cooling circuit 124. The first cooling circuit 110 contains a compressor 112 which is supplied with energy by a fuel cell 120. The second cooling circuit 124 is supplied with mechanical energy by the internal combustion engine 138 of the motor vehicle. The cooling circuits 110 and 124 share the condenser 114, the expansion element 116, e.g., an expansion valve, and the evaporator 122. In this way, the invention can also be used in a motor vehicle with only one evaporator 122, selectively, one or the other of the compressors 112, 126 being operated. Depending on the operating mode, the valve 136 is set accordingly. The system can be used to benefit in this configuration in a truck or in a commercial vehicle. The broken line shows that the system can be easily combined with another evaporator 118 with its own expansion element 134, e.g., an expansion valve. The evaporator 122 can be used in the already described manner especially for air conditioning of the sleeping compartment of a commercial vehicle.

Figure 12:
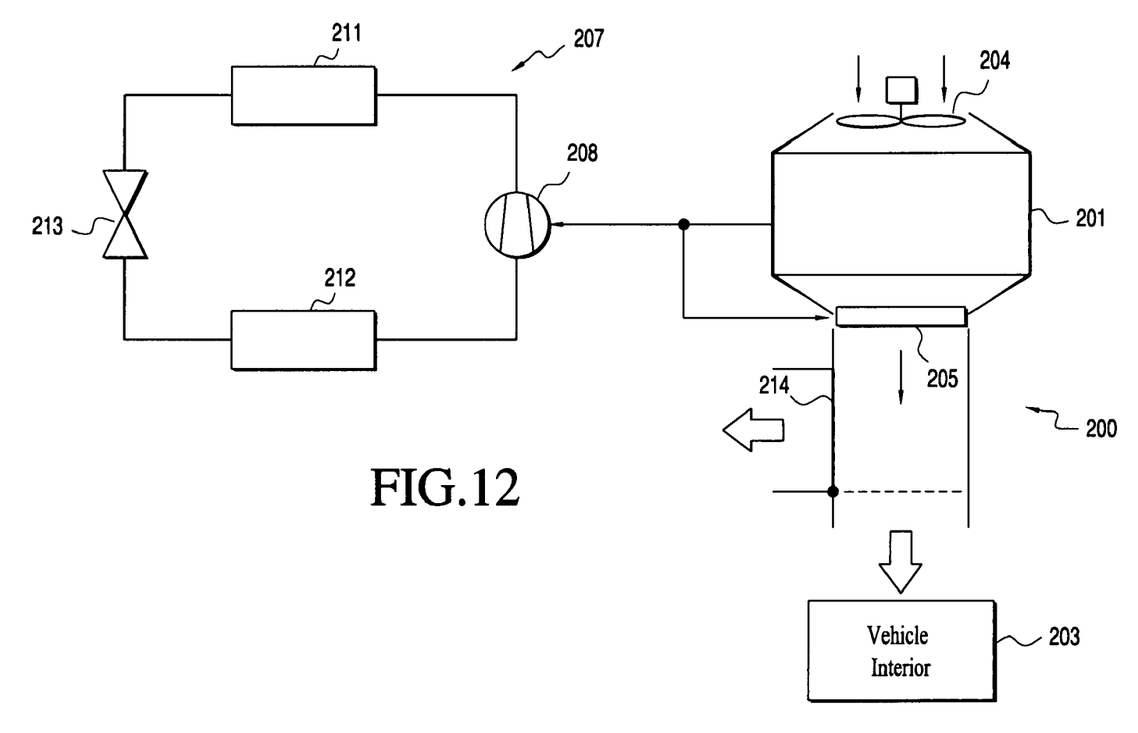
FIG. 12 shows an embodiment of a climate control unit of the invention with a direct air supply.

The climate control unit shown in FIG. 12 is suited both for heating and also for cooling a vehicle interior. The energy necessary both for heating and cooling the vehicle interior is made available by a fuel cell 201. The fuel cell type used in this embodiment is preferably a PEM-FC (proton exchange membrane fuel cell), since the operating temperature of this fuel cell is well suited for air cooling of the fuel cell and heating of the vehicle interior.

The fuel cell 201 is built such that air can flow through it. To produce an air flow, there is a fan unit 204. The air flow produced by it absorbs the exhaust heat of the fuel cell 201 and leaves the fuel cell again. In heating operation of the climate control unit shown, the air flows subsequently through the electrical heating unit 205 which is supplied by the current produced by the fuel cell. The air which has been preheated by the exhaust heat of the fuel cell is therefore additionally heated again by the electrical heating unit 205. To transfer the heat which is produced by the fuel cell 201 and the electrical heating unit 205 to the vehicle interior, heat transfer means 200 is provided. In the simplest case, the heat transfer means 200 is formed by an air guide which guides the heated air directly into the vehicle interior 3.

To control the heat flow which is supplied to the vehicle interior 203, there are several possibilities. The first possibility is to change the output of the electrical heating unit 205. At the same time, the fuel supply to the fuel cell 201 would have to be adapted. The second possibility is to vary the air flow which is produced by the fan unit 204. However, in doing so, it must be watched that heat dissipation from the fuel cell 201 is sufficient so that the maximum allowable operating temperature is not exceeded. It must always be watched that the parameters in producing the heat flow are linked to one another, i.e., the intensity of the air flow, the amount of electrical energy produced, and the output of the electrical heating unit 205 are linked to one another and cannot be regulated without the other parameters being adapted accordingly.

Another possibility for changing the heat flow entering the vehicle interior 203 is to divert part of the heated air to the outside. To do this, in FIG. 12, there is a flap 214 which can be pivoted such that the air cannot reach the vehicle interior 203 or only part of it can do so and the other part is released to the outside. Discharging the hot air to the outside can be necessary when the climate control unit or heating system of the vehicle interior is to be turned off suddenly, but cooling is still necessary for dissipating the heat generated or still stored in the fuel cell. Moreover, a case of operation is possible in which very low heat output is desirable, but the fuel cell delivers a minimum output during operation that is greater than the required power for the heating of the vehicle interior 203.

Normally, in climate control units of this type, rapid control of the heat output is not critical. One advantageous use is, for example, for heating the sleeping compartment in trucks. The sleeping compartment is comparatively small and the temperature desired there is not very high. Therefore, low heat output is sufficient. Since it can be planned long beforehand when the desired temperature is to be reached, there can be a comparatively long heating time until the desired room temperature is reached. To maintain the room temperature, likewise a low heat output is necessary. The small required heat output also enables, first of all, the advantageous configuration of the fuel cell 201 as an air cooled system. For larger outputs, it would no longer be possible to ensure sufficient cooling by air. Based on the air cooling, the climate control unit is made very compact and can be operated as an independent component without the other means of the vehicle infrastructure having to be included. For example, the climate control unit could be made as a module that can be inserted into a suitable drawer area in the cab of a truck.

The climate control unit of the invention can be easily expanded such that stationary cooling operation is possible, i.e., with the vehicle engine turned off. To do this, the described fuel cell is coupled to a cooling circuit 207. Cooling circuits, in the illustrated embodiment, require a compressor 208 by which a vaporous coolant is compressed. In a downstream condenser 211, the pressurized coolant vapor condenses. In the evaporator 212, the cooling liquid evaporates, the cold produced by evaporation being used to cool the air supplied to the vehicle interior 203. Then, the vaporous cooling liquid is re-compressed by the compressor 208. At a suitable location of the cooling circuit 207, there is generally a control valve 213 to regulate the operation of the cooling circuit.

In known climate control units, the compressor of the cooling circuit is driven either mechanically or electrically. In stationary operation, there is the problem that the cooling circuit cannot be operated if the engine of the vehicle is not running. In an electrically operated compressor, stationary operation is theoretically possible, but the length of operation depends on the capacity of the battery. Even in high-capacity batteries, cooling operation over a longer time is not possible.

In the climate control unit of FIG. 12, the electrical compressor 208 of the cooling circuit 207 is supplied with power from the fuel cell 201. In this way, the cooling circuit 207 can also be operated during longer stationary times without the need for the vehicle engine to be in operation. In cooling operation, the fan unit 204 of the climate control unit runs in order to cool the fuel cell 201. The generated current is not made available to the electrical heating unit 205, but is used to operate the electrical compressor 208. The air heated by the fuel cell 201 is not supplied in the above described manner to the vehicle interior 203, but is discharged to the outside by opening of the flap 214.

Of course, the electrical current produced by the fuel cell 201 can be used not only for operating the heating unit 205 or the compressor 208, but can also be used for other vehicle components such as, for example, interior vehicle lights or a radio system.

Figure 13:
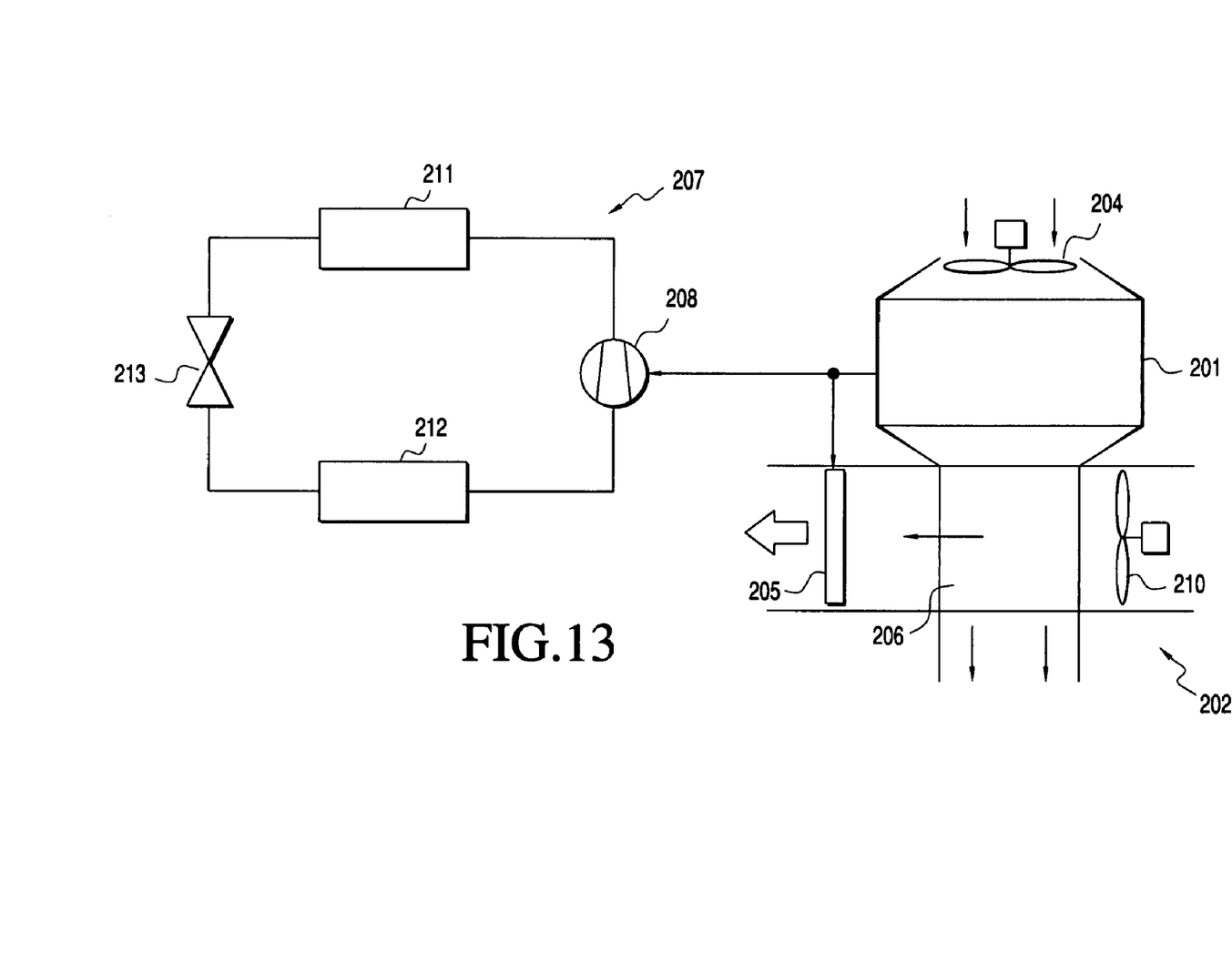
FIG. 13 shows another embodiment of a climate control unit in accordance with the invention with heating via a heat exchanger.

FIG. 13 shows a another embodiment of a climate control unit in accordance with the invention. In the version shown here, the air which is heated as the fuel cell 201 is cooled is not routed directly into the vehicle interior 203, but instead, the air is routed through a heat exchanger 206 and then to the outside. To heat the vehicle interior 203, there is a second air flow which is produced by a second fan 210 and which is likewise routed via the heat exchanger 206. The air guides are designed such that the two air flows cannot mix. In the direction of the vehicle interior, the heat exchanger 206 is connected upstream of the electrical heating unit 205 which is operated, as in the embodiment of FIG. 12, by the electrical energy produced by the fuel cell 201.

The advantage of the arrangement described here is that, on the one hand, an odor which forms in the fuel cell 201 is prevented from being transferred to the vehicle interior, and on the other hand, it is ensured that a leak in the fuel cell 201 cannot lead to toxic gases entering the vehicle interior. Another advantage is that, by separating the air flows, the amount of air reaching the vehicle interior 203 can be adjusted independently of the cooling of the fuel cell 201 by the second fan 210 being operated as is optimum for heating of the vehicle interior 203.

The embodiment shown in FIG. 13 also has the potential for operating the electrical compressor 208 of the cooling circuit 207 in order to thus enable stationary cooling when the engine of the motor vehicle is not in operation.

Figure 14:
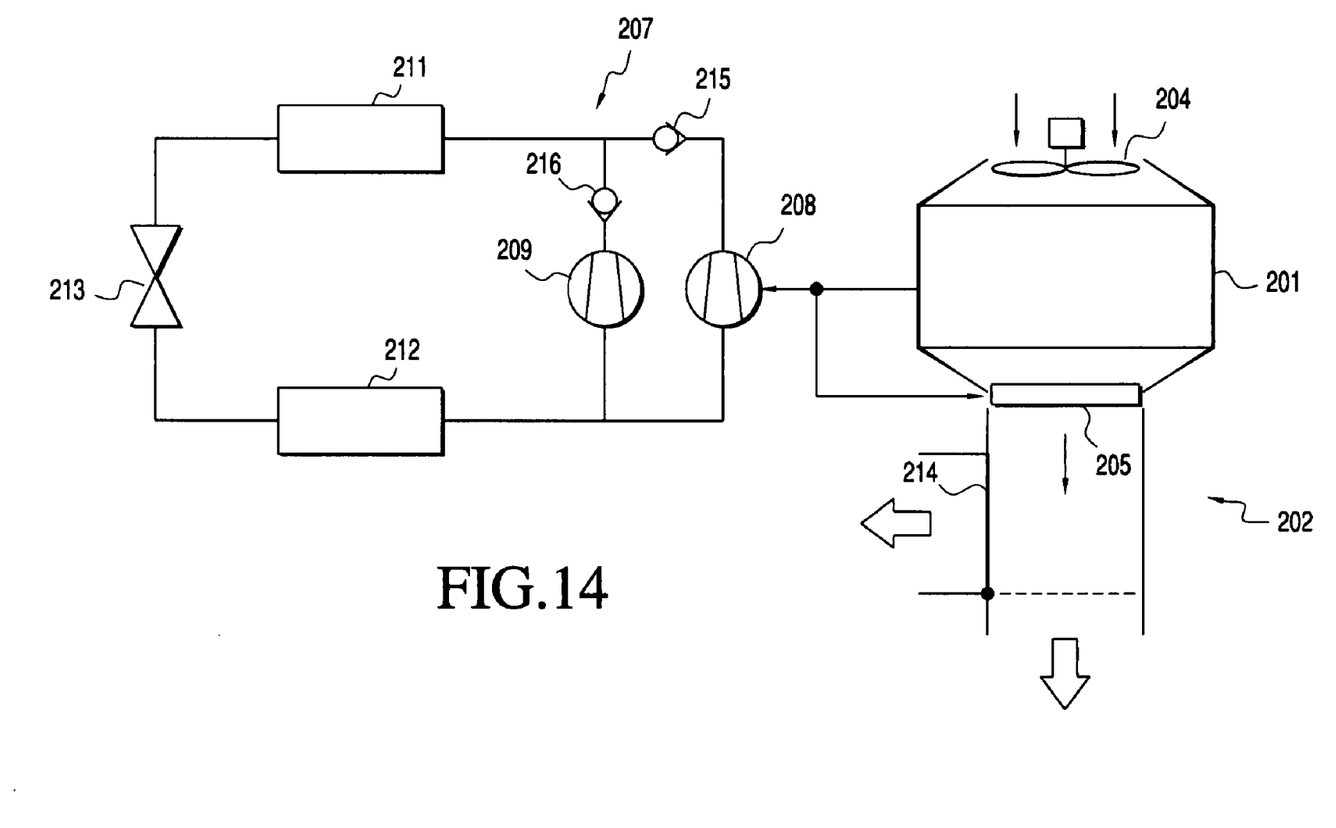
FIG. 14 shows a further embodiment of a climate control unit of the invention with a cooling circuit which has two compressors.

FIG. 14 shows one development of the embodiment from FIG. 12. In this embodiment, in the cooling circuit 207 there are two compressors, one electrical compressor 208 which is supplied by the fuel cell 201, and a mechanical compressor 209 which is operated, for example, by the internal combustion engine of the motor vehicle. The two compressors are located in part parallel to one another so that the cooling circuit can be operated either with the electrical compressor 208 or the mechanical compressor 209 or there can be parallel operation of the two compressors, similar to the arrangement of the FIG. 3 embodiment. Via the two valves 215, 216 each of the indicated configurations of the cooling circuit 207 an be adjusted.

While driving, the mechanical compressor 209 is in operation. The fuel cell 201 need not be turned on. Only in the case of operation when power is not to be taken from the internal combustion engine to operate the cooling circuit 207, is the fuel cell 201 additionally started up in order to support or replace the mechanical compressor 209 by the electrical compressor 208. In stationary operation with the engine turned off, only the electrical compressor 208 is operated via the fuel cell 201.

What is claimed is:

1. System for cooling and heating the interior of a motor vehicle, comprising:
   a first cooling circuit with a first compressor; a condenser, an expansion element, and a first evaporator,
   one of an APU and a fuel cell connected for driving the first compressor by means of electrical energy,
   at least one second cooling circuit having at least a second evaporator, the at least one second cooling circuit being connected to the first cooling circuit,
   a condenser common to the first cooling circuit and the second cooling circuit;
   at least one flow controller for selectively directing coolant flow through only the first cooling circuit, through only the second cooling circuit or through both the first and second cooling circuits; and
   a second compressor which is one of mechanical driven and a hybrid compressor,
   wherein the first compressor is connected to the first evaporator, and
   wherein the second compressor is connected to the second evaporator.

2. System as claimed in claim 1, wherein the first compressor is a hybrid compressor.

3. System as claimed in claim 1, wherein the second compressor is a mechanical driven compressor.

4. System as claimed in claim 1, wherein the first compressor is connected to the second evaporator.

5. System as claimed in claim 1, wherein the first evaporator is adapted for cooling a sleeping compartment of a commercial vehicle when a vehicle engine is turned off.

6. System as claimed in claim 1, wherein the second evaporator is adapted for cooling a driver's compartment of a commercial vehicle.

7. System as claimed in claim 1, further comprising an electrical heater and wherein said one of an APU and a fuel coil is a fuel cell, said fuel cell being connected for powering the electrical heater when a vehicle engine is turned off.

8. System as claimed in claim 1, wherein said one of an APU and a fuel cell is a fuel cell, and wherein exhaust heat of the fuel cell is connected for supplying heat to a cooling circuit of an internal combustion engine for supplying heat to a vehicle interior compartment with the engine timed off.

9. System for cooling and heating an interior of a motor vehicle, comprising:
   a first cooling circuit with a first compressor, a condenser, an expansion element, and a first evaporator,
   one of an APU and a fuel cell connected for driving the compressor by means of electrical energy,
   at least one second cooling circuit with at least a second compressor, and
   at least one flow controller for selectively directing coolant flow through only the first cooling circuit through only the second cooling circuit or through both the first and second cooling circuits;
   wherein the at least one second cooling circuit is connected to the first cooling circuit and
   wherein a condenser is provided that is common to the first cooling circuit and the second cooling circuit.

10. System for cooling and heating an interior of a motor vehicle, comprising:
    a first cooling circuit with a compressor, a condenser, an expansion element, and an evaporator for cooling of the interior of the motor vehicle during operation of an engine of the vehicle, a second cooling circuit connected to the first cooling circuit tin cooling the vehicle interior when the vehicle engine is turned off, and at least one flow controller for selectively directing coolant flow through only the first cooling circuit through only the second cooling circuit or through both the first and second cooling circuits;

wherein said compressor is driven by electrical energy from one of an APU and a fuel cell for cooling when the vehicle engine is turned off, and wherein the condenser is common to the first and second cooling circuits.

* * * * *